J. JONES.
Rotary Measure.
No. 16,359.
Patented Jan. 6, 1857.
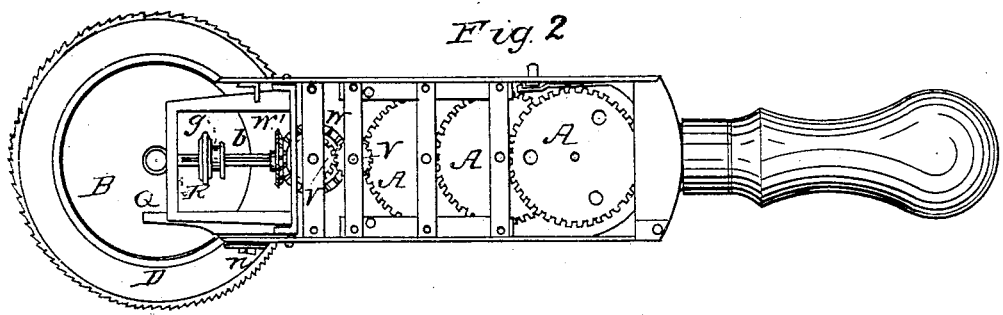
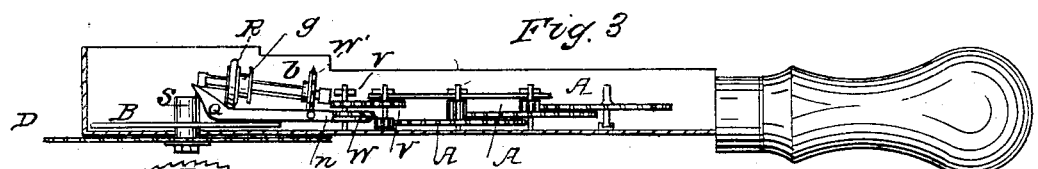
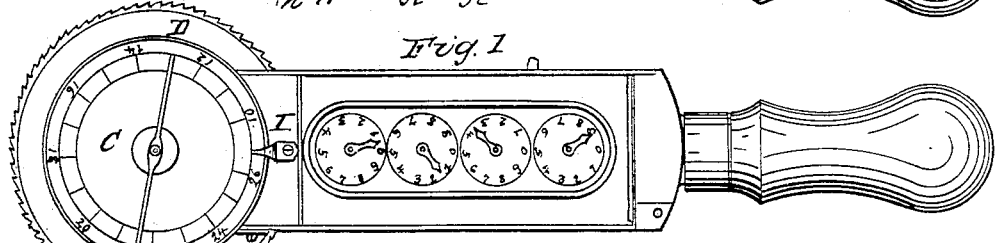
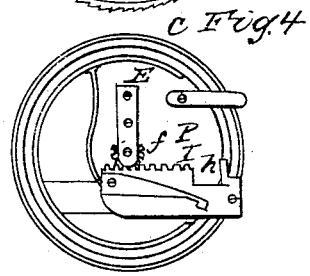

UNITED STATES PATENT OFFICE.

JAMES JONES, OF ROCHESTER, NEW YORK.

INSTRUMENT FOR MEASURING BOARDS.

Specification of Letters Patent No. 16,359, dated January 6, 1857.

*To all whom it may concern:*

Be it known that I, JAMES JONES, of the city of Rochester, in the county of Monroe and State of New York, have invented a certain new and useful Machine for Accurately Measuring and Registering Lineal, Superficial, or Solid Quantities, of which machine the following is a full and accurate description, reference being had to the accompanying drawings, making part of this specification, and of said drawings Figure 1 is a plan of the machine when together and complete. Fig. 2 is a plan of the machine having the top corner and dial plate removed. Fig. 3 is a vertical section on the central longitudinal line of Fig. 2. Fig. 4 is a view of the under surface of the cover C, Fig. 1, exhibiting the mechanism employed for adjusting the position of the friction roller R on the disk.

The nature of this invention will be best understood from a description of the drawings, where it will be seen that the machine consists primarily of a measuring wheel (D) and dial or register similar in general construction to the perambulator or surveying wheel.

The steel disk when rolled across any surface, revolves after the manner of a carriage wheel, and the perimeter of the disk being known, the number of times it has revolved will of course give the lineal dimensions of any surface. The number of revolutions are registered by the dial plate seen in Fig. 1, the motion being transferred from the disk to the wheels carrying the hands or indices, by means of the friction roller (R), bevel wheels (W W) and the small spur wheels (V V). These small spur wheels transfer the motion to the train of wheels A, A, A, each succeeding one of which is driven by a pinion on the shaft of the one immediately preceding it (that is, the one nearest the disk D). While, in order that the register or dial plate may accurately indicate units, tens, hundreds, &c., the wheels are all ten times the diameter of the pinions which drive them—as is usual in all registering instruments.

It will now be evident that on the disk's being rolled over the length or breadth of any amount of surface, whether in one, or in several parts—it will indicate by the register or dial plate, the aggregate lengths or breadths of the whole—the fractional parts of the unit of measure, (as feet or inches) belonging to each several part of the surface, being all accurately carried forward. Thus if any number of boards of varying widths be taken, the instrument on being rolled across each of them singly, will express on the register the aggregate width of the lot. And it will be further evident that if the boards be all exactly twelve feet long, the number of inches expressed on the register, will accurately indicate the number of square feet contained in the boards. But if the length of the boards be greater or less than twelve feet, the amount indicated by the register will exceed or fall short of the exact number of square feet in the boards, in a ratio which may be accurately expressed by the ratio of the length to twelve feet. Hence if the amount of motion transferred from the disk to the register, could be varied in the same ratio, it is evident that the quantity indicated by the register would still express accurately the number of square feet in the boards. Thus if the boards were twenty-four feet long, and the first wheel or pinion of the register moved twice as fast as it did while measuring the twelve feet boards, the numbers on the dial would still express the area in square feet. My invention consists in the results produced by effecting this variation in the relative movements of the disk (D) and the indices on the dial plate; which variation may be effected by various, though analogous methods. Thus the disk itself may be made to contract or expand, which will of course vary the amount of angular motion, while the actual motion remains the same. Or the motion may be transferred from the disk to the register, by means of change wheels of various sizes, when the proper sized change wheel being used to communicate motion from the disk to the register, the latter will give accurate results. But the method which I prefer, and which is shown in the drawings and exhibited in the model, is as follows: Attached to the shaft (S) which passes through the disk D, is the second disk B working on the inside of the machine. Against this latter disk works the friction roller (R) which slides on the same shaft as that which carries the first bevel wheel ($w'$). The friction roller (R) serves to drive said bevel wheel, as, although it slides longitudinally on the shaft ($b$) it is prevented from rotating on it by means of a feather or key seen in Fig. 2. It will now be readily seen that the amount of motion transferred from the disk to the friction roller, or thence to the register, will depend upon the distance of the latter from the center of the former. And in order to vary this distance in an effective manner, I have adopted the mechanism seen in Figs. 2 and 4. It will there be seen that the top plate (e) is constructed so as to rotate on the box (E) and carries a pinion (f) on its center. This pinion being geared into the rack (r) will slide it (the rack) backward or forward as the cover may be turned. The rack carries a hook (h) which passes beneath the shaft (b) and works in the gland (g) attached to the friction roller; hence any motion imparted to the rack or its hook, will be communicated to the roller, and as the top plate and pinion move independently of the cover (P) to which the rack is attached, the rotation of the top plate will cause the rack to slide backward or forward as the case may be. The top plate is graduated, and on its being turned, the stationary index (I) will point accurately to the position required of it in order to place the roller at the proper distance from the center of the disk B so as to indicate correctly the number of square feet contained in any breadth of a surface of determinate length.

The numbers on the top plate in the drawing and model are designed for lumber measuring. And the numbers indicate in feet the length of any boards of which the breadth, being measured by the disk, the register will give their area in square feet. It is evident however, that the same principle is applicable to the measurement of any surface—the graduation on the top plate being carried out more fully. It is also applicable to the measuring and registering of cubic quantities. Thus planks, three inches thick and twelve feet long, may be accurately measured, and the quantity expressed in board measure, by setting the friction roller, or (which is the same thing,) the top plate, so that every inch over which the disk passes in the breadth of the boards, will indicate three square feet on the register. Or it may be reduced to cubic feet by setting the instrument so that four inches passed over by the disk, will indicate one on the dial plate. It is further evident that when the index points to twelve on the top plate, the instrument is correctly adjusted for measuring lineal quantities, and expressing the amount in inches.

When it is desired to throw the disk (B) out of gear with the register, by moving the slide (Q) the friction roller is raised out of contact with the disk (B) and consequently no movement of the disk (D) will affect it, the roller. The slide (Q) is continued to the outside of the instrument where it forms the button (n.) Its action will be readily understood from an inspection of the drawings Figs. 2 and 3. The index across the cover, is used for indicating the position of the instrument on the board. It is designed to be always placed nearly vertical, and thus to show the exact point at which the measurement commences and ends.

I am aware that the quantities of areas have been indicated by means of the combination of a cone or disk with a roller sliding thereon and therefore I disclaim the use of the above elements either separately or when combined with a single index as in the machine of M. Ernst described in the *Bulletin de la Société de l'Industrie Nationale* Vol. 40 pl. 841. But in all the cases which have come under my observation the instruments constructed on the above principle have been used only for application to plans or drawings of the area to be measured and Therefore I claim—

My means of so adapting the instrument that it may be applied to the actual surface whether of a board or other article; — such means consisting of the outer and inner disks combined with the two indices—one of said indices being intended to regulate the position of the friction roller on the inner disk and the other for indicating the quantity measured.

JAMES JONES.

Witnesses:
 JOHN PLINE,
 M. C. GARDNER.